US006244516B1

United States Patent
Langervik et al.

(10) Patent No.: US 6,244,516 B1
(45) Date of Patent: Jun. 12, 2001

(54) THERMOSTAT VALVE

(75) Inventors: Lennart Langervik, Onsala; Simo Kettunen, Mölndal; Thord Mårtensson, Kode, all of (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/530,627

(22) PCT Filed: Nov. 3, 1998

(86) PCT No.: PCT/SE98/01985

§ 371 Date: Jun. 22, 2000

§ 102(e) Date: Jun. 22, 2000

(87) PCT Pub. No.: WO99/24701

PCT Pub. Date: May 20, 1999

(30) Foreign Application Priority Data

Nov. 6, 1997 (SE) .................................... 9704087

(51) Int. Cl.[7] ........................................ F01P 7/16
(52) U.S. Cl. ........................................ 236/34.5; 236/93 R
(58) Field of Search .................... 236/34, 34.5, 93 R, 236/93 A, 99 J, 99 K

(56) References Cited

U.S. PATENT DOCUMENTS

| 3,157,357 | * | 11/1964 | Bailey et al. | 236/34.5 |
|---|---|---|---|---|
| 4,055,298 | | 10/1977 | Wilson | 236/34.5 |
| 4,314,664 | * | 2/1982 | Wisyanski | 236/34.5 |
| 4,537,346 | * | 8/1985 | Duprez | 236/34.5 |
| 4,562,953 | | 1/1986 | Duprez et al. | 236/34.5 |
| 5,018,664 | * | 5/1991 | Butler | 236/34.5 |
| 5,261,597 | | 11/1993 | Perlman et al. | 236/93 |

* cited by examiner

Primary Examiner—William E. Tapolcai
(74) Attorney, Agent, or Firm—Lerner, David, Littenberg, Krumholz & Mentlik, LLP

(57) ABSTRACT

Thermostat valves are disclosed for guiding the flow of coolant in an internal combustion engine, which includes three channels with a central valve chamber, the first channel including a first valve seat, and in which the thermostat valve includes a valve housing mounted within the valve chamber and including an opening facing the second channel and including a second valve seat, a tubular valve body movably mounted with respect to the valve housing along a valve axis between a first end position in which the tubular valve body bears against the first valve seat such that the first and second channels are in fluid communication and the first and third channels are blocked, and a second end position in which the tubular valve body bears against the second valve seat such that the first and second channels are in fluid communication and the first and third channels are blocked, and a temperature sensitive switch for moving the tubular valve body between the first and second end positions, in which the valve housing also includes a peripheral casing wall extending from the attachment of the valve housing to the engine wall for attachment to the tubular valve body and a closed end wall portion such that when the tubular valve body is in the second end position the closed end wall closes the second opening of the tubular valve body.

5 Claims, 4 Drawing Sheets

THERMOSTAT VALVE

FIELD OF THE INVENTION

The present invention relates to a thermostat valve for guiding a coolant flow in a coolant system in an internal combustion engine.

BACKGROUND OF THE INVENTION

U.S. Pat. No. 4,055,298, for example, discloses a thermostat valve for a coolant system, in which the valve body forming part of the valve is provided on one side of the holder, as viewed along the longitudinal axis of the valve, more precisely downstream in the coolant system. In this manner, the valve body will in practice be located outside the cylinder head of the internal combustion engine, and will thus require a separate valve housing, which is both costly and requires a considerable amount of space to achieve. Furthermore, a condition for the known thermostat valve is that two out of the three connecting channels connects to the valve laterally, i.e. crossways in relation the longitudinal axis of the valve, which results in losses of pressure, thus demanding a great deal of the capacity of the coolant pump.

An object of the present invention is to provide a thermostat valve which is space-saving and which results in reduced losses of pressure in relation to known solutions.

SUMMARY OF THE INVENTION

In accordance with the present invention, this and other objects have now been realized by the invention of a thermostat valve for guiding the flow of coolant in an internal combustion engine including a first channel including a first valve seat, a second channel, and a third channel, the first, second and third channels being in fluid communication with a valve chamber, the thermostat valve comprising a valve housing including outer attachment means adapted to mount the valve in a fixed position within the valve chamber, the valve housing including a valve housing opening facing the second channel, and including a second valve seat, a tubular valve body including a first end including a first opening facing the first channel and a second end including a second opening facing the second channel, the tubular valve body being movably mounted with respect to the valve housing along a valve axis between a first end position wherein the tubular valve body bears against the first valve seat whereby the first and second channels are in fluid communication and the first and third channels are not in fluid communication, and a second end position wherein the tubular valve body bears against the second valve seat whereby the first and second channels are not in fluid communication and the first and third channels are in fluid communication, and a temperature sensitive switch for moving the tubular valve body between the first and second positions, the valve housing further including a peripheral casing wall extending from the outer attachment means attached to the tubular valve body at a location spaced from the second valve seat, and a closed end portion whereby when the tubular valve body is in the second end position the closed end wall portion closes the second opening of the tubular valve body. In a preferred embodiment, the valve housing opening extends radially around the closed end wall portion of the valve housing, and the valve includes a plurality of bridging members bridging the valve housing opening to support the closed end walled portion thereon.

In accordance with one embodiment of the thermostat valve of the present invention, the peripheral casing wall includes sealing means for sealing the peripheral casing wall to the tubular valve body. Preferably, the peripheral casing wall includes an end portion distal from the outer attachment means defining an end opening for the tubular valve body, and the sealing means is disposed at the end portion of the peripheral casing wall.

In accordance with another embodiment of the thermostat valve of the present invention, the first and second channels are in communication with the valve chamber substantially axially, and the third channel is in communication with the valve chamber substantially radially.

BRIEF DESCRIPTION OF THE DRAWINGS

The present invention will be more fully appreciated with reference to the following detailed description which, in turn, makes reference to the annexed drawings, in which.

DETAILED DESCRIPTION

Figure 1:
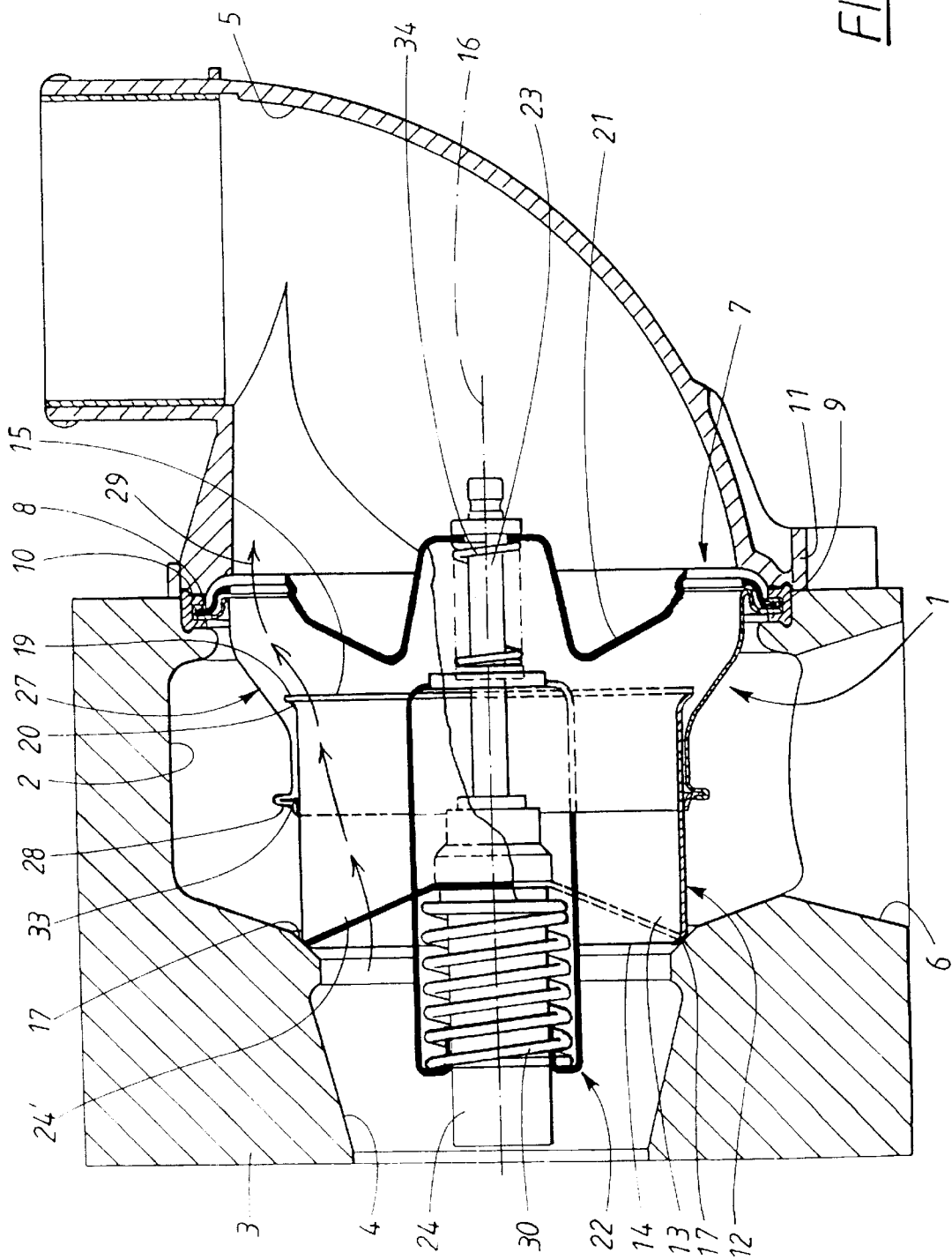
FIG. 1 is a side, elevational, partially sectional view showing the thermostat valve according to the present invention in a first end position.
Figure 2:
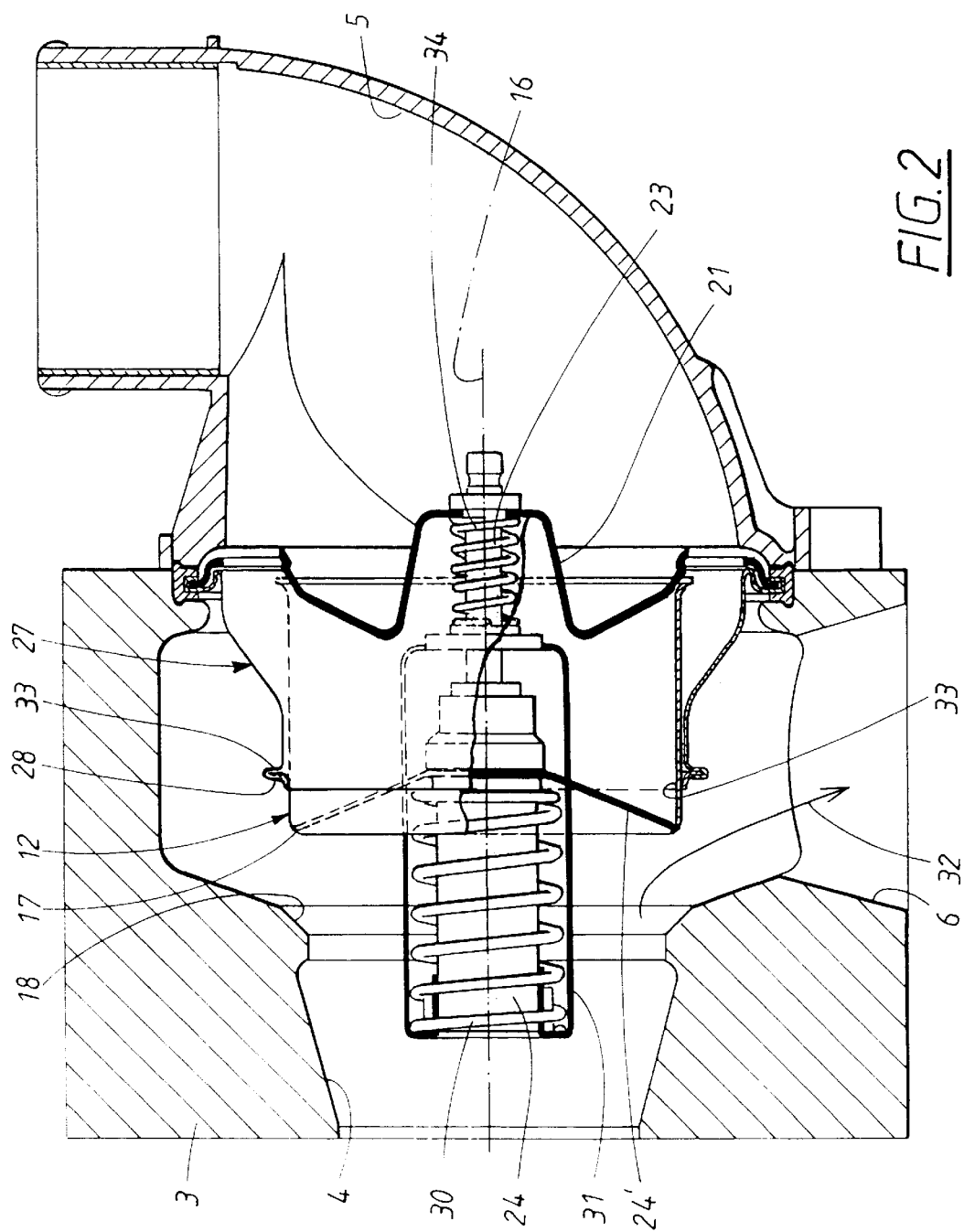
FIG. 2 is a side, elevational, partially sectional view showing the thermostat valve of FIG. 1 in a second end position.

As is apparent from FIGS. 1 and 2, the thermostat valve I according to the present invention is intended to be mounted in an internal combustion engine, more precisely the cylinder head 3, of which a cut-out section is shown schematically in these Figures. The thermostat valve is intended to form part of a coolant system for the circulation of coolant between the calorific or higher temperature parts of the internal combustion engine, namely, the engine block and the cylinder head on the one hand, and, on the other hand, a radiator (not shown). The thermostat valve provides for temperature control of the coolant by means of the fact that it guides the coolant flow from a first channel 4 to a second channel 5, which leads to the radiator, and alternatively to a third channel 6, which forms a so-called by-pass connection, which is connected in parallel with the radiator and by-passes the radiator depending upon the temperature.

The thermostat valve 1 discloses a holder 7, which is provided with peripherally external attachment members 8 in the form of an attachment flange having a sealing ring 9 which sealingly connects the flange to the cylinder head 3 in a peripheral recess 10 in an opening of the valve chamber 2 towards the second channel 5. The channel 5 is formed by a tube 5 which, in the example, is provided with a contact flange 11, wherein the holder is kept in place in a fixed position at the connection of the contact flange 11 to the cylinder head 3. The thermostat valve comprises a valve body 12, which is essentially tubular, and which is designed as an open piston having a cylindrical casing wall 13 and a first circular opening 14, which is permanently open towards the first channel 4, which in the example is an inlet channel. The valve body discloses a second opening 15, which also is circular and is arranged in the opposite end of the body and faces the second channel 5, which in the example is an outlet channel. In the example shown in FIG. 1, the thermostat valve is essentially rotationally symmetrical and includes surfaces having circular cross-sectional forms, as viewed in a radial plane in relation to a main axis 16, which forms a longitudinal axis, along which the valve body 12 is adapted to move. Furthermore, the valve body 12 has a first annular sealing surface 17 which is adapted to sealingly bear against a first annular valve seat 18 in an end position for the valve (see FIG. 1), the valve seat being arranged in the valve chamber 2 at the passage to the first inlet channel 4. At the opposite end, the valve body 12 is designed having a second annular sealing surface 19, which is adapted to bear against a valve seat 20 in an additional end position for the valve, the valve seat being supported by the holder 7 (see FIG. 2).

As is apparent from the drawings, the holder 7 supports a closed end wall 21, which is provided with a circular peripheral edge, which is located at a radius from the longitudinal axis 16, so that it forms the above-mentioned valve seat 20. In this manner, the opening 15 of the valve body is kept closed in the position which is shown in FIG. 2, while at the same time the valve body holds the communication open between the first channel 4 and the third channel 6.

The switch-over of the valve body 12 between its end positions is provided by means of a switch-over mechanism 22, which can be of a known type and is temperature-sensing and adapted to be mounted in the closed wall 21 by means of an axle 23 and, by means of a cylindrical body 24, to be connected to the valve body 12 by means of spokes 24, between the thermostat body 24 and the valve body 12. A pressure spring 30 in the form of a helical spring acts against the mounting of the spokes at the thermostat body 24. The spring is clamped between the spokes 24 and one of the ends of two braces 31 which in its other end is mounted in the axle 23 by means of a second helical spring 34. By means of a temperature-dependent relative movement between the axle 23 and the thermostat body 24, movement of the valve body is created in the known manner by means of, for example, the use of wax having a suitably adapted melting-point, which provides a large volume expansion and, when the coolant temperature is rising, urges the thermostat body backwards when a selected temperature limit has been reached.

Figure 3:
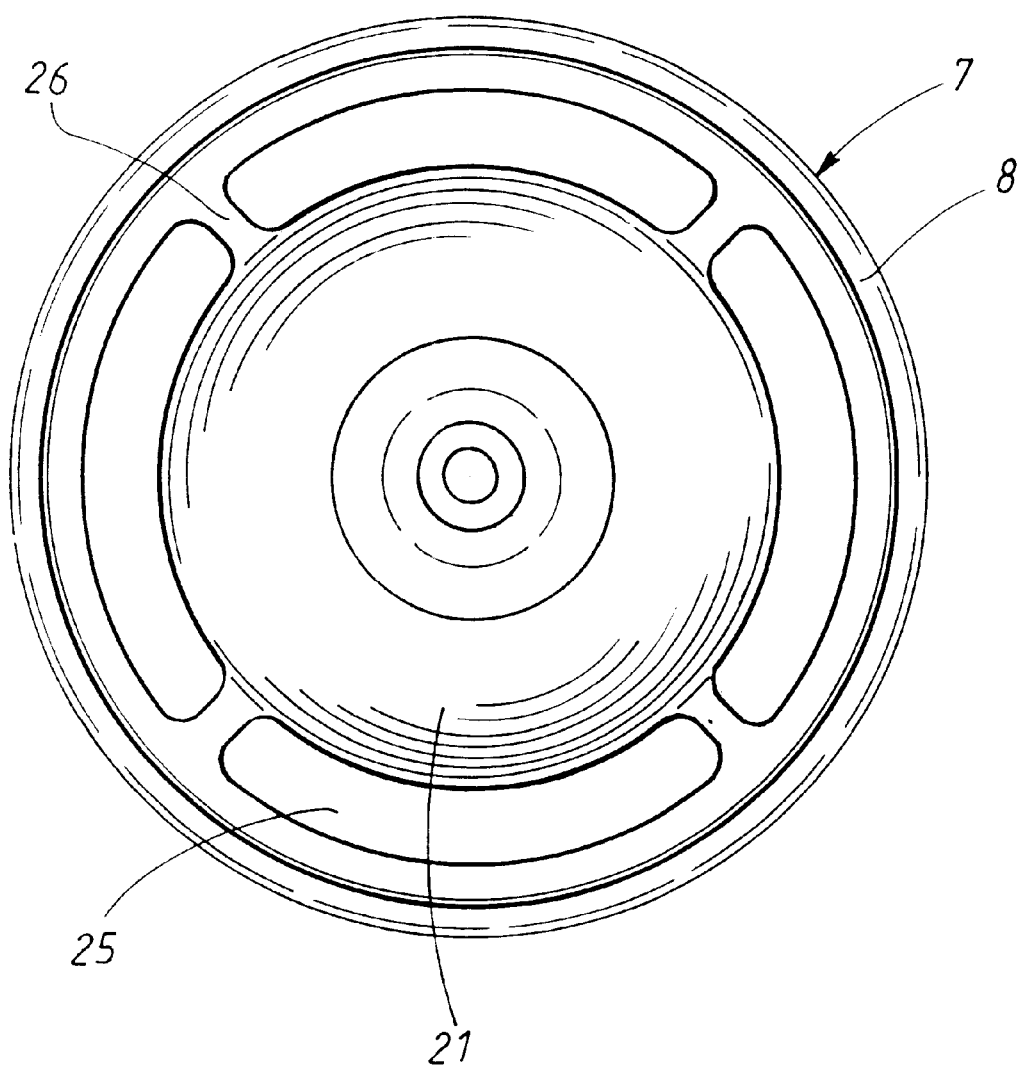
FIG. 3 is a front end, elevational view of the thermostat valve of FIG. 1.
Figure 4:
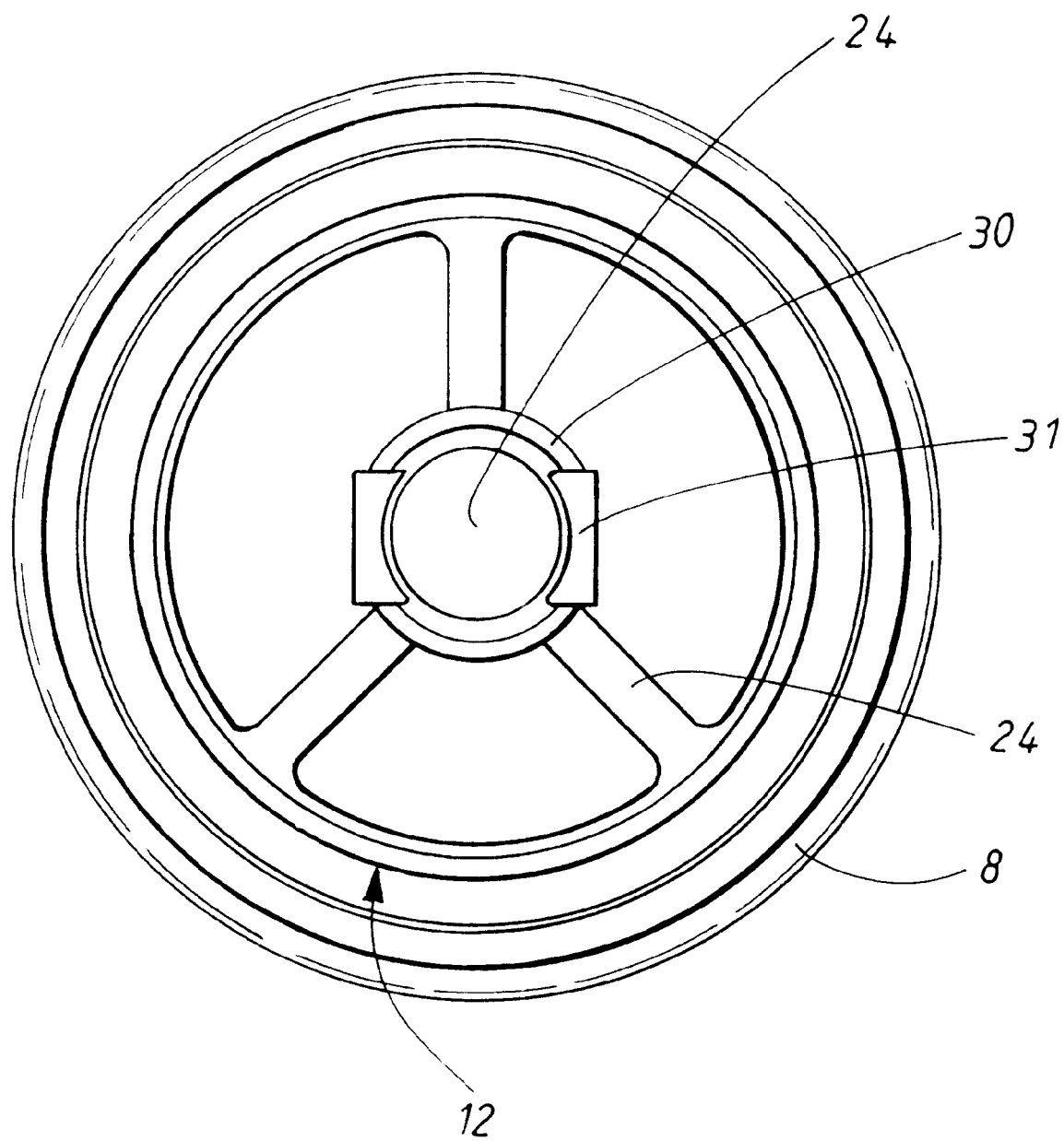
FIG. 4 is a rear end, elevational view of the thermostat valve of FIG. 1.

Between the attachment members 8 of the holder 7 and the closed end wall 21, a number of outlet openings 25 are provided, which extend around the end wall 21, but which are interrupted by bridge-like sections 26 of the holder (see FIG. 3). Furthermore, the holder 7 discloses a collar-like casing wall 27 which extends peripherally outside the valve body 12, and extends from the external attachment members 8 of the holder, on the one hand, axially in the direction towards the first channel 4 and, on the other hand, radially inwards in order to sealingly bear against the cylindrical casing surface 13 of the valve body by means of a sealing member 28 which runs around the casing surface, while at the same time it permits- a gliding motion in relation to the valve body. The sealing member 28 is, for example, an elastical sealing-ring of a suitable polymer, which is supported by the casing wall 27 at its rear peripheral edge 33, which surrounds an opening through which the valve body 12 extends.

By providing the closed end wall 21 in combination with the openings 25 and the closed casing wall 27, the main part of the thermostat valve can extend along the same side of the holder, more precisely inside the chamber 2 together with the switch-over mechanism 22 having the thermostatic function.

By means of the above-described apparatus, it is assured that when the thermostat valve is at its end position, according to FIG. 1, wherein the valve body 12 with its sealing surface 17 sealingly bears against the seat 18 in the valve chamber 2, the communication between the first channel 4, i.e. the inlet channel, and the third channel 6, i.e. the outlet channel to the by-pass connection, remains broken. Instead, by means of the fact that the coolant flow is allowed to flow in the direction of the arrows 29 through the valve body, i.e. in through one of its openings and out through its opposite opening, and further out through the openings 25, the communication between the inlet channel 4 and the outlet channel 5 to the radiator is kept open. As long as the coolant temperature exceeds a predetermined limit value, wherein the coolant flow is guided through the radiator by means of the outlet channel 5 for cooling, i.e. reduction of the coolant temperature, this position according to FIG. 1 is maintained in the selected example. As is apparent from FIG. 1, the casing wall 27 as well as the end wall 21 are suitably designed in order to provide a smooth, essentially axially directed, laminar flow out towards the outlet channel 5, which then can be guided in the desired direction.

Thus, the valve body 12 is adapted to be transferred by means of the switch-over mechanism 22 when the temperature is sinking, starting at the selected limit value for the coolant temperature, wherein the valve body is transferred from the first seat 18 in the direction towards the second seat 20. In this regard, the communication between the inlet channel 4 and the outlet channel 6 to the by-pass connection is gradually opened, and the coolant flow is thus gradually redirected from outlets in the outlet channel 5 to outlets in the outlet channel 6, i.e. in the direction of the arrow 32 in the selected example, and through the by-pass connection or the bridging connection. By means of the fact that the closed end wall 21 together with the casing wall 13 of the valve body, and the casing wall 27 from the sealing member 28 to the attachment member 8, form a completely closed end surface, the flow towards the outlet channel 5, i.e. in the example shown in FIGS. 1 and 2, through the radiator, is completely interrupted when the valve body has reached the end position which is shown in FIG. 2 and in which the annular sealing surface 19 sealingly bears against the valve seat 20.

Inversely, the valve body executes an opposite movement by means of the switch-over mechanism 22 when the temperature of the coolant is rising and has reached a predetermined limit value for the temperature, which is essentially the same as the limit value for the sinking temperature or, as a result of hysteresis in the mechanism, is actually slightly higher in practice. In this regard, the valve body moves gradually from the position shown in FIG. 2 and in the direction towards the position shown in FIG. 1. The character of the temperature-control led function can either be selected as a high-grade on/off regulation with fast movements between the end positions, i.e. essentially either opened or closed towards one or the other of the outlet channels, 5 and 6, respectively, or in the form of a high-grade continuous regulation, where the valve during the main part of the operating process is situated in an intermediate position between the end positions with a gradually varying opening area towards one or the other of the outlet channels.

The above-described return movement, i.e. the retraction of the axle 23 into the thermostat body 24, is provided, by means of which the valve body strives towards its end position according to FIG. 1 when the wax in the thermostat body cools and reaches a selected temperature limit by means of the above-described pressure spring 30. By positioning the switch-over mechanism 22 at the same side of the holder as the valve body 12 and the casing wall 27, it is additionally assured that the overall length of the valve is limited.

The invention is not limited to the embodiment which is described above and shown in the drawings, but may be varied within the scope of the appended claims. For example, it is in principle possible to design the thermostat valve having an edged cross-sectional form. Furthermore, the switch-over mechanism may be of another temperature-sensing type. The smaller helical spring 34 may in principle be excluded.

What is claimed is:

1. A thermostat valve for guiding the flow of coolant in an internal combustion engine including a first channel including a first valve seat, a second channel, and a third channel, said first, second and third channels being in fluid communication with a valve chamber, said thermostat valve comprising a valve housing including outer attachment means adapted to mount said valve in a fixed position within said valve chamber, said valve housing including a valve housing opening facing said second channel, and including a second valve seat, a tubular valve body including a first end including a first opening facing said first channel and a second end including a second opening facing said second channel, said tubular valve body being movably mounted with respect to said valve housing along a valve axis between a first end position wherein said tubular valve body bears against said first valve seat whereby said first and second channels are in fluid communication and said first and third channels are not in fluid communication, and a second end position wherein said tubular valve body bears against said second valve seat whereby said first and second channels are not in fluid communication and said first and third channels are in fluid communication, and a temperature-sensitive switch for moving said tubular valve body between said first and second positions, said valve housing further including a peripheral casing wall extending from said outer attachment means attached to said tubular valve body at a location spaced from said second valve seat, and a closed end wall portion whereby when said tubular valve body is in said second end position said closed end wall portion closes said second opening of said tubular valve body.

2. The thermostat valve of claim 1 wherein said valve housing opening extends radially around said closed end wall portion of said valve housing, and including a plurality of bridging members bridging said valve housing opening to support said closed end wall portion thereon.

3. The thermostat valve of claim 1 wherein said peripheral casing wall includes sealing means for sealing said peripheral casing wall to said tubular valve body.

4. The thermostat valve of claim 3 wherein said peripheral casing wall includes an end portion distal from said outer attachment means defining an end opening for said tubular valve body, and said sealing means is disposed at said end portion of said peripheral casing wall.

5. The thermostat valve of claim 1 wherein said first and second channels are in communication with said valve chamber substantially axially and said third channel is in communication with said valve chamber substantially radially.

\* \* \* \* \*